United States Patent [19]

Vink et al.

[11] 4,450,179

[45] May 22, 1984

[54] TWO COMPONENT SOFT CANDY

[75] Inventors: Walter V. Vink, Purdys, N.Y.; Deborah G. Aldrich, Stamford, Conn.

[73] Assignee: Nabisco Brands, Inc., Parsippany, N.J.

[21] Appl. No.: 392,425

[22] Filed: Jun. 25, 1982

[51] Int. Cl.³ ............................................. A23G 3/00
[52] U.S. Cl. .................................. 426/103; 426/660; 426/516
[58] Field of Search ............... 426/660, 103, 572, 659, 426/516

[56] References Cited

U.S. PATENT DOCUMENTS

| | | | |
|---|---|---|---|
| 2,851,365 | 9/1958 | Perrozzi | 426/660 |
| 4,105,801 | 8/1978 | Dogliotti | 426/660 |
| 4,229,484 | 10/1980 | Steels | 426/660 |
| 4,278,700 | 7/1981 | Barents | 426/660 |
| 4,344,972 | 8/1982 | Wienecke | 426/660 |

*Primary Examiner*—Jeanette M. Hunter
*Attorney, Agent, or Firm*—Richard Kornutik

[57] ABSTRACT

A two-component soft candy composition including a supportive water-retaining shell portion and a variably flavored and colored core portion which can be produced by coextrusion.

13 Claims, No Drawings

TWO COMPONENT SOFT CANDY

BACKGROUND OF THE INVENTION

The present invention relates to soft candy confections, and, in particular, to two component candy confections with a generally soft candy consistency throughout, but having components which are variable in taste, texture, and color.

In the art of candy making, continual efforts are directed toward producing an attractive highly flavorful candy product. Relative to candy confections which have consistently "soft" texture throughout, problems are encountered in developing attractive new products which are unique and easily adaptable to the commercial production and sale of soft candies.

For example, it is important that a soft candy composition remain in a sufficiently plasticized condition prior to production to undergo normal commercial manufacturing processes while at the same time having the capability of maintaining the final form rendered by mold or other candy forming methods. This candy processing and forming consideration is further complicated when special effects such as increased sweetness, color and/or texture change, unique design, etc. are attempted, because of the effect(s) each of the additives has on processing.

The sweetener used in soft candy is usually sugar (sucrose) and/or glucose in crystallized or uncrystallized form which is combined with fat and plastic binder, such as gelatin, pectin, dextrin, or other gelatinous substances, to render a coherent plastic paste. Conventional compositions and processes for preparation thereof have several drawbacks including the requirement for expensive processing equipment for concentrating syrup by moisture reduction and extensive hold-up periods to allow the candy to set sufficiently for subdividing and wrapping. Furthermore, although soft candy compositions presently known in the art may have desired plasticity upon completion of the manufacturing process, they have been found to become rapidly hard after a relatively short storage period which makes them undesireable to consumers after even a brief shelf-life.

Thus, a need exists for soft-candy composition which can be varied to form a unique and attractive two-component candy unit without incurring extensive processing requirements as well as the problems of remaining commercially suitable over an extended storage period.

In U.S. Pat. No. 4,097,616 to Guillou, et al., a process for making soft candy at temperatures below 60° C. in standard chewing gum/bubble gum processing and packaging equipment is shown. Specifically, Guillou, et al. disclose blending at temperatures below 60° C. a finely subdivided sweetener, such as sucrose, lycasin and polyhydric alcohols, substantially in the crystalline state with a binder and only sufficient water to provide a soft paste which is amenable to formation into rope or sheet form, followed by cooling the paste and forming it into candy units. This disclosure, as well as U.S. Pat. No. 3,518,095 to Harding, et al., and U.S. Pat. No. 3,745,022 to Broeg, et al., show formation of a candy paste composition by addition of just enough water to yield a deformable mass.

U.S. Pat. No. 3,908,032 to Didelot, et al. discloses a process for making soft candy by rapidly concentrating and cooling an aqueous solution of sugar, glucose, fat, and binder, mixing and stretching the resulting paste and extruding the homogenized paste into rods.

Deformability, which is usually directly related to moisture content, is very important in the production of soft candy since a firm but plastic paste is important in candy processing. Thus in U.S. Pat. Nos. 3,265,508; 3,265,509; and 3,265,510 all to Wurzburg, et al., a method is shown of making a confectionery product by subjecting a composition mixture of sugar and starch simultaneously to heat and pressure of an extruder used to form a plastic, shape-retaining confectionery mass. Similarly, in U.S. Pat. No. 3,950,551 to Glabe, et al., a process for producing composite food products is described wherein dehydrated sugary syrups, which include partially gelatinized starch in the form of dried flakes is moistened with water and, optionally, a small amount of an edible vegetable oil, is extruded as desired in the form of short rods or tubes and dried until the moisture content is reduced to approximately 1.0–4.0% by weight.

Candy softness after production, which is highly desirable for enhanced bite-through, chew properties, palatability, taste, and texture, is also generally directly related to the amount of moisture contained therein. High moisture content, in the end product however, is not easily achieved because of the water-losing characteristics of soft candy compositions and/or the reduced water-content level required for a thermoplastic candy to properly set for further processing and handling. To this end, U.S. Pat. No. 4,208,476 to Tsao describes a process for injecting steam into an extrudate as it exists from an extruder; but the high energy-consuming—and thus expensive method disclosed by Tsao is directed to the preparation of semi-moist pet food which is usually packaged to prevent moisture migration therefrom.

By the present invention, however, a soft candy composition is provided which solves the aforementioned problems in the form of an attractive two-component candy unit.

BRIEF DESCRIPTION OF THE INVENTION

In accordance with the present invention a two-component soft candy composition is provided which includes a soft-texture outer portion having good moisture-stabilizing and support capabilities, and soft-texture inner portion capable of having incorporated therein components of variable moisture-retention attributes, sweetness level, flavor, color, texture, etc. which are different from the outer portion.

Specifically, the shell portion of the present candy composition includes sweeteners and/or bulking components in a ratio of hydrophilic components to hydrophobic components which is greater than at least about 0.2, and greater than about 1 in the case of corn syrup to sugar, i.e., the shell portion has an amount of water-retaining components which precludes excessive loss of moisture from the shell portion and retards migration of moisture from the center portion. Contradistinctively, the core portion of the present composition includes components which, while they may have high moisture content, can be chosen irrespective of their water-retention characteristics. The ratio by weight of the core portion to shell portion can be from about 0.1:1 to about 4:1, but preferably is from about 0.2:1 to about 2:1. As a result of the present two-component soft candy composition, a soft candy core intense in flavor, sweetness, color, and moisture can be provided which renders an attractive overall candy unit high in flavor, sweetness, and moisture content and good attribute-retention capabilities. Moreover, and quite surprisingly, such a high quality candy product having good shelf-life, i.e., retention capabilities, would not be achievable with the same net composition of ingredients in a single component soft candy unit.

Soft candy usually comprises a composition of sugar, glucose, and fat to which flavoring agents, acidulating agents, and suitable coloring matter are added in order to impart the desired flavor and color. The amounts of the various components employed depends on the characteristics desired in the end product. It has now been found that a soft-texture shell portion for a two-component soft candy can be provided by incorporating a ratio of hydrophilic sweetener such as corn syrup to hydrophobic sweetener such as sugar, which is characterized by its tendency not to lose or gain moisture. Thus in the case of corn syrup to sugar syrup, the amount by weight of hydrophilic component must be greater than the amount of hydrophobic component in the shell portion.

The water-retaining characteristic of the outer shell can be measured as a function of the equilibrium relative humidity (ERH) of the composition which is defined as the relative humidity at which the composition will neither gain nor lose water. In particular, it is important that the shell portion of present two-component soft candy composition have the ability to retain moisture even when the ambient relative humidity is less than the equilibrium relative humidity of the shell composition; and it is also important that the shell exhibit at least some resistance to acquiring additional moisture when the ambient relative humidity is greater than the equilibrium relative humidity of the shell composition.

In order to achieve a soft but firm outer shell portion which retains its own moisture over an extended period of time and at the same time prevents migration of moisture from the core portion, it is desirable to provide a shell portion which has an equilibrium relative humidity of from about 30% to about 70%, which will neither lose nor gain more than about 2% of weight due to moisture migration at an ambient relative humidity of from about 30% to about 70% at from about 20°–40° C. Preferably, the shell portion of the present two-component candy composition has an equilibrium relative humidity of from about 35% to about 55% and neither gains nor loses more than about 1% by weight of moisture at the above conditions.

To attain a suitable composition exhibiting such stable moisture characteristics as a soft candy is quite difficult since sugar (sucrose), which is the primary ingredient in soft candy tends to readily lose water below about 60° C., i.e., it is hydrophobic in nature. In a preferred embodiment of the present invention, however, this problem has been overcome by replacing a major portion of the sugar component in the outer shell composition with a moisture stabilizing component such as corn syrup. This means that the ratio of the amount of corn syrup to the amount of sugar in the outer shell portion is greater than 1.0.

By means of using the outer shell portion described above, an inner core portion can be provided with less concern regarding its ability to retain moisture. Consequently, the core portion may contain several times as much flavor ingredient(s), sweetener(s), colorant(s), etc. as the shell portion. As a result of the present two-component soft composition the candy unit resulting therefrom can be more intensely flavored and can be formed of more than one color which enhances its commercial value tremendously.

It has also been discovered that by use of the present invention a two-component soft candy composition can be produced on a continuous basis by coextrusion of the two components, the outer shell portion being extruded as a hollow rope while the core portion is extruded simultaneously into the hollow portion of the shell rope.

Moreover, and quite surprisingly, it has been found that by use of one of the preferred embodiments described herein, a two-component soft candy having an inner core portion with a color different than the outer shell portion can be produced by coextrusion without the bleeding of the two colors into the accompanying component.

For a better understanding of the present invention, together with other and further objects, reference is made to the following examples, and its scope will be pointed out in the appended claims.

EXAMPLES OF THE INVENTION

The present two-component soft candy composition can be prepared in accordance with the following general formulae.

GENERAL FORMULA FOR SHELL PORTION

| Component | Percent by Weight |
| --- | --- |
| Hydrophobic Component(s) | 10–85% |
| Hydrophilic Component(s) | 15–98% |
|  | (The ratio of Hydrophilic Components to Hydrophobic Components must be >0.2) |
| Fat or Vegetable Oil | 0–10% |
| Binder, such as gelatin | 0.01–5% |
| Emulsifiers | 0–2% |
| Invert sugar | 0–2% |
| Flavorant(s) | 0–.35% |
| Acidulating Agent(s) | 0–2.0% |
| Coloring Agent(s) | 0.01–1.20% |
| Dextrins | 0.01–5% |
| Water | Balance |

GENERAL FORMULA FOR CORE PORTION

| Component | Percent by Weight |
| --- | --- |
| Hydrophobic Component(s) | 10–98% |
| Hydrophilic Component(s) | 0–85% |
| Fat or Vegetable Oil | 0–10% |
| Binder | 0.01–5% |
| Emulsifiers | 0–2% |
| Invert Sugar | 0–2% |
| Flavorant(s) | 0–0.8% |
| Acidulating Agent(s) | 0.2–3.5% |
| Coloring Agent(s) | 0.05–1.5% |
| Dextrins | 0.01–5% |
| Water | Balance |

The following table shows a preferred general formula for the present two-component soft candy composition.

PREFERRED GENERAL FORMULA FOR SHELL PORTION

| Component | Percent by Weight |
| --- | --- |
| Liquid Sugar | 10–65% |
| Corn Syrup | 15–85% |
|  | (the ratio of Corn |

-continued

| Component | Percent by Weight |
|---|---|
| | syrup to Liquid Sugar must be >1.) |
| Fat or Vegetable Oil | 2–7% |
| Gelatin | 0.1–3% |
| Emulsifiers | 0.5–1.5% |
| Flavorant(s) | 0.04–0.25% |
| Acidulating Agent(s) | 0–1.2% |
| Coloring Agent(s) | 0.05–0.75% |
| Dextrins | 0.01–2% |
| Water | Balance |

PREFERRED GENERAL FORMULA FOR CORE PORTION

| Component | Percent by Weight |
|---|---|
| Liquid Sugar | 15–85% |
| Corn Syrup | 0–65% |
| Fat or Vegetable Oil | 2–7% |
| Binder | 0.1–3% |
| Emulsifiers | 0.5–1.5% |
| Flavorant(s) | 0.05–0.5% |
| Acidulating Agent(s) | 0–2.5% |
| Coloring Agent(s) | 0.08–0.8% |
| Dextrins | 0.01–2% |
| Water | Balance |

Using the general formulae given above a two-component soft candy composition may be prepared by coextruding a shell portion simultaneously with a core portion which has been prepared as described below.

The shell portion is made by combining the corn syrup, liquid sugar, fats or vegetable oils, and coloring agent(s) under agitation to a temperature of from about 240° F. to about 300° F., and preferably to a temperature of from about 260° F. to about 280° F. To this mixture may be added a pre-gum prepared by mixing cold water and dextrins, and corn syrup while under agitation, after which gelatin is added under slow stirring. Optionally, the ingredients in the pre-gum may be included in the sugar/corn syrup mixture separately according to methods known in the art.

In any event, after the ingredients listed above have been thoroughly mixed, flavorant and the acidulating agent is introduced into the outer shell portion by mixing while cooling. This combination, which is crystallized by methods known in the art such as pulling, allowing to grain, etc., is then ready to be coextruded as a hollow rope into which the core portion is simultaneously extruded.

The core portion is prepared in the same manner as the shell portion with the exception that different kinds and amounts of ingredients may be chosen in accordance with the desired product appearance and flavor.

A highly flavored, attractive co-extruded soft candy product was prepared according to the method outline above using the following compositions:

PRE-GUM

| Component | Percent by Weight |
|---|---|
| Corn Syrup 43° Be (42° DE) | 15.88 |
| Dextrins | 4.24 |
| Gelatin 130° Bloom Type "B" | 31.77 |
| Water | 48.11 |
| | 100.00 |

SHELL PORTION BASE

| Component | Percent by Weight |
|---|---|
| Corn Syrup 43° Be (42° DE) | 44.64 |
| Liquid Sugar | 43.45 |
| Fats | 5.96 |
| Pre-Gum | 5.95 |
| | 100.00 |

SHELL PORTION COMPOSITION

| Component | Percent by Weight |
|---|---|
| Shell Base | 99.34 |
| Acidulant Cherry Flavor | .56 |
| Red Dye Blend | .10 |
| | 100.00 |

CORE PORTION BASE

| Component | Percent by Weight |
|---|---|
| Corn Syrup 43° Be (42° DE) | 35.38 |
| Liquid Sugar | 52.83 |
| Fats | 5.89 |
| Pre-Gum | 5.90 |
| | 100.00 |

CORE PORTION COMPOSITION

| Component | Percent by Weight |
|---|---|
| Core Base | 98.12 |
| Acidulant Cherry Flavorant | 1.65 |
| Red Dye Blend | .23 |
| | 100.00 |

The above shell and core portions were coextruded to form a continuous soft candy rope having a light red (or pink) outer portion and a darker red inner portion which was subsequently shaped and cut into individual candy units. The shell and core compositions above were found to be extremely compatible resulting in interior and exterior portions in which color integrity remained constant over the entire length of the coextruded rope.

Furthermore, the overall texture of the candy units, which was satisfyingly soft, was sustained over a period of at least six months in normal semi-permeable wrapping.

Tests were conducted with samples of the preferred shell portion prepared as set forth above by subjecting them to ambient atmospheres with varying relative humidities to determine the moisture stability of the shell portion. The results are shown in TABLE I.

TABLE I

SHELL PORTION

| RELATIVE HUMIDITY | WEIGHT IN GRAMS INITIAL | WEIGHT IN GRAMS AFTER 12 DAYS | DIFFERENCE IN GRAMS | PERCENT CHANGE |
|---|---|---|---|---|
| 10% | 7.0891 | 7.0786 | −.0105 | −.15 |
| 25% | 5.6585 | 5.6495 | −.0090 | −.16 |
| 35% | 6.7199 | 6.7118 | −.0081 | −.12 |
| 35% | 6.2363 | 6.2322 | −.0041 | −.07 |
| 45% | 6.2917 | 6.2921 | +.0004 | — |
| 55% | 6.6429 | 6.6720 | +.0291 | +.44 |
| 66% | 6.4623 | 6.5789 | +.1169 | +1.77 |

At a Constant Temperature of 24° C.

As evident from the data, the equilibrium relative humidity of the composition is a little less than 45%. The tendency of the composition to give up moisture at a relative humidity lower than its equilibrium relative humidity is quite low, i.e., only 0.15% at 10% relative humidity after 12 days; and at a relative humidity of 66%, the composition acquires less than 2% moisture thus exhibiting a very high moisture-stabilizing capability.

Although the combination of corn syrup and sugar is the preferred embodiment of this invention, other combinations of hydrophilic and hydrophobic sweetening-/bulking components may be used. For example, sucrose, a hydrophobic component, is used with invert sugar, a hydrophilic component, according to the formula set forth below.

SUCROSE/INVERT SUGAR GENERAL FORMULA FOR SHELL PORTION

| Component | Percent by Weight |
|---|---|
| Sucrose | 10–65% |
| Invert Sugar | 10–50% (the ratio of Invert Sugar to Sucrose must be >0.2) |
| Fat or Vegetable Oil | 2–7% |
| Gelatin | 0.1–3% |
| Emulsifiers | 0.5–1.5% |
| Flavorant(s) | 0.04–0.25% |
| Acidulating Agent(s) | 0–1.2% |
| Coloring Agent(s) | 0.05–.75% |
| Dextrins | 0.01–2% |
| Water | Balance |

Another possible combination of sweeteners is that of hydrogenated starch hydrolysates, a hydrophilic component such as the one sold under Trade name Lycasin, and hydrogenated sugar, a hydrophobic component such as that sold under the Trade name Palatinit. The formula for this combination is as follows.

HYDROGENATED SUGAR/HYDROGENATED STARCH HYDROLYSATE GENERAL FORMULA FOR SHELL PORTION

| Component | Percent by Weight |
|---|---|
| Hydrogenated Sugar (Palatinit) | 10–65% |
| Hydrogenated Starch Hydrolysate (Lycasin) | 15–85% (the ratio of Lycasin to Palatinit must be >1) |
| Fat or Vegetable Oil | 2–7% |
| Gelatin | 0.1–3% |
| Emulsifiers | 0.5–1.5% |
| Flavorant(s) | 0.04–0.25% |
| Acidulating Agent(s) | 0–1.2% |
| Coloring Agent(s) | 0.05–.75% |
| Dextrins | 0.01–2% |
| Water | Balance |

Thus, while there have been described what are presently believed to be the preferred embodiments of the present invention, those skilled in the art will realize that changes and modifications may be made thereto without departing from the spirit of the invention, and it is intended to claim all such changes and modifications as fall within the true scope of the invention.

We claim:

1. A two-component soft candy composition comprising:
    a supportive moisture stable shell portion comprising
    a hydrophilic component selected from the group consisting of corn syrup, invert sugar, and hydrogenated starch hydrolysates;
    a hydrophobic component selected from the group consisting of sugar and hydrogenated sugar, in proportions such that said shell portion has an equilibrium relative humidity of from about 30% to about 70% at a temperature of about 24° C. and the gain and loss of moisture of said shell portion at 24° C. is not more than about 2% by weight; and
    a core portion containing flavoring, sweetening, and coloring ingredients which are hydrophobic in nature.

2. The two-component soft candy composition of claim 1 which is obtained by extrusion of said shell portion as a continuous hollow rope along with said core portion simultaneously coextruded into the hollow portion of said shell rope.

3. The two-component soft candy composition of claim 1 wherein said hydrophilic component is corn syrup and said hydrophobic component is sugar present in a corn syrup to sugar ratio which is greater than one.

4. The two-component soft candy composition of claim 1 wherein said hydrophilic component is invert sugar and said hydrophic component is sugar present in an invert sugar to sugar ratio which is greater than 0.2.

5. The two-component soft candy composition of claim 1 wherein said hydrophilic component is hydrogenated starch hydrolysates and said hydrophobic component is hydrogenated sugar present in a hydrogenated starch hydrolysate to hydrogenated sugar ratio which is greater than one.

6. The two-component soft candy composition of claim 1 wherein the equilibrium relative humidity of said shell portion is from about 35% to about 55%.

7. The two-component soft candy composition of claim 1 wherein the shell portion neither gains more loses more than about 1% by weight moisture.

8. The two-component soft candy composition of claim 1 wherein the ratio by weight of said core portion to said outer shell portion is from about 0.1:1 to about 4:1.

9. The two-component soft candy composition of claim 8 wherein the ratio of said core portion to said shell portion is from about 0.2:1 to about 2:1.

10. The two-component soft candy composition of claim 1 wherein said core portion has a color different than said shell portion.

11. The two-component soft candy composition of claim 1 wherein said core portion has more flavorant than said shell portion.

12. The two-component soft candy composition of claim 1 wherein said core portion has a higher intensity of sweetness than said shell portion.

13. A method of forming the two-component soft candy composition of claim 1 which comprises:
   forming a pre-gum by combining dextrins, cold water, corn syrup, and gelatin;
   mixing a shell composition of corn syrup, sugar, fats, coloring agent and half of said pre-gum in proportions such that the ratio of said corn syrup to said sugar is greater than 1, the equilibrium relative humidity of said shell portion is from about 30% to about 70% at a temperature of about 24° C., and the gain and loss of moisture at a temperature of about 24° C. is not more than about 2% by weight;
   combining soft candy ingredients as desired with the remaining half of said pre-gum to form said core portion;
   crystallizing said core portion and shell portion; and
   coextruding said portions to form said two-component soft candy composition.

* * * * *